United States Patent [19]

Taylor

[11] 4,053,550

[45] Oct. 11, 1977

[54] VULCANIZATION METHOD

[75] Inventor: Challen E. Taylor, Portadown, Northern Ireland

[73] Assignee: The Goodyear Tire & Rubber Company, Akron, Ohio

[21] Appl. No.: 664,606

[22] Filed: Mar. 8, 1976

Related U.S. Application Data

[63] Continuation-in-part of Ser. No. 506,386, Sept. 16, 1974, abandoned.

[30] Foreign Application Priority Data

Oct. 29, 1973 United Kingdom ............... 50138/73

[51] Int. Cl.² .............................................. B29H 5/01
[52] U.S. Cl. ..................................... 264/347; 34/155; 264/236; 425/325; 425/363
[58] Field of Search ............... 264/347, 346, 234–236, 264/345, DIG. 42, 82, 83, 103, 281; 34/155; 425/363, 383, 325, 28 B

[56] References Cited

U.S. PATENT DOCUMENTS

| 1,415,929 | 5/1922 | Grosvenor | 425/363 |
|---|---|---|---|
| 1,543,926 | 6/1925 | Kemp | 264/347 |
| 1,682,876 | 9/1928 | Weisse | 264/346 |
| 1,943,101 | 1/1934 | Wheatley | 264/347 |
| 2,241,856 | 5/1941 | Herrstrom et al. | 264/236 |
| 2,781,550 | 2/1957 | Spencer | 264/347 |
| 3,161,484 | 12/1964 | Bagnoli et al. | 34/155 |
| 3,567,380 | 3/1971 | Townsend | 8/115.5 |
| 3,690,796 | 9/1972 | Borsvold | 264/347 |
| 3,793,426 | 2/1974 | Ritchie | 264/231 |
| 3,824,141 | 7/1974 | Miller et al. | 156/143 |

Primary Examiner—Jeffery R. Thurlow
Attorney, Agent, or Firm—F. W. Brunner; L. A. Germain

[57] ABSTRACT

A method of vulcanizing continuous lengths of elastomeric or plastomeric material which comprises driving the material through an enclosure, within which it is subjected to vulcanizing conditions, in the form of a helix, the helix convolutions in part contacting a drive mechanism and in part being freely suspended. Also an apparatus for vulcanizing continuous lengths of flexible material, comprising an enclosure, means for providing therein an atmosphere at an elevated temperature and pressure, spaced pressure-retaining inlet and outlet means for the continuous flexible material, and drive and support means for feeding the material through the enclosure in the form of a helix comprising partially unsupported convolutions. The invention is particularly useful in the vulcanization of hosing formed for example by extrusion or by helical winding or both.

3 Claims, 1 Drawing Figure

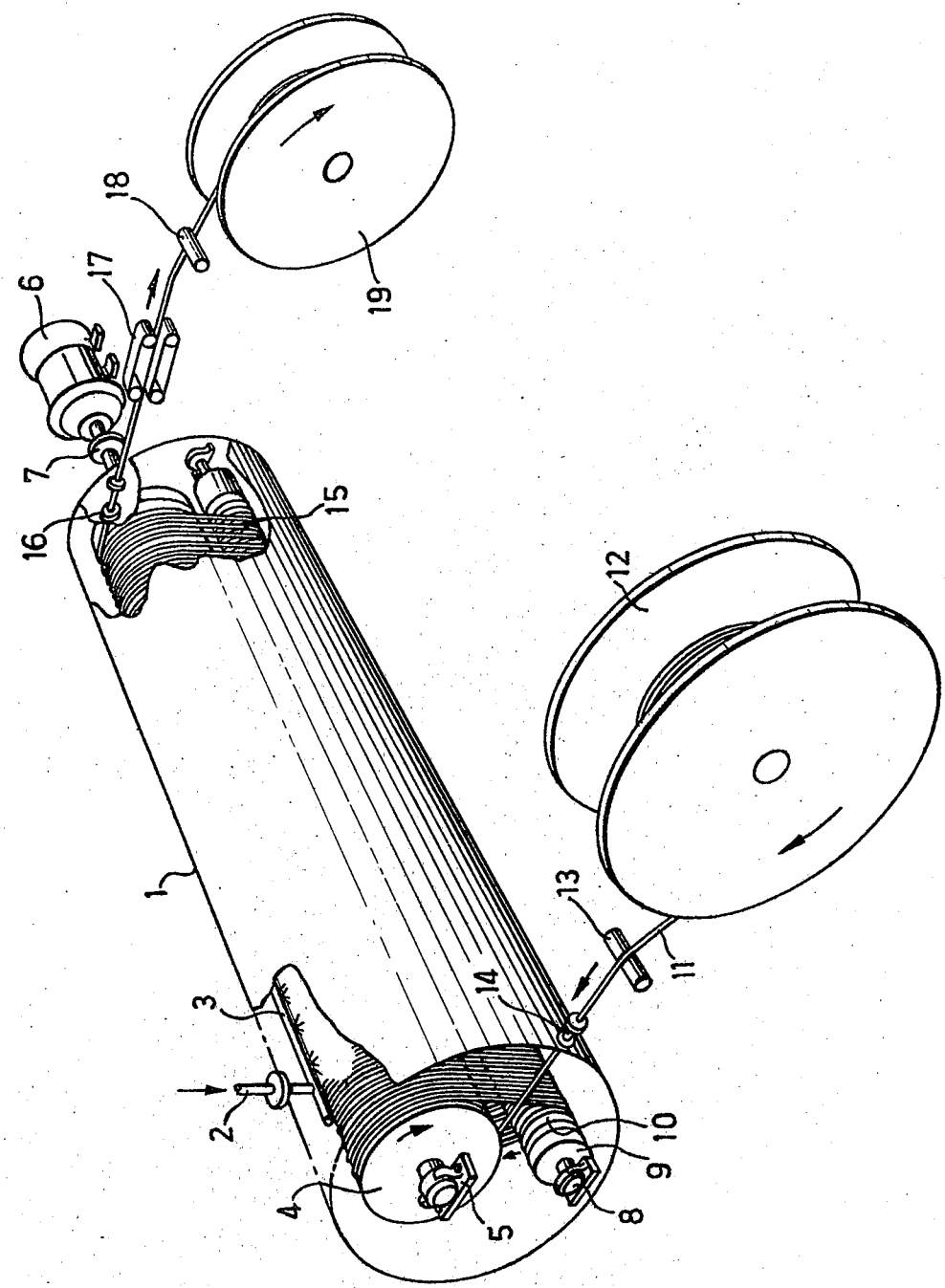

VULCANIZATION METHOD

This application is a continuation-in-part of my original application Ser. No. 506,386 filed Sept. 16, 1974, now abandoned.

This invention relates to the vulcanization of continuous lengths of elastomeric or plastomeric material or of structures comprising the same. In particular although not exclusively the invention relates to the vulcanization of hosing formed for example by extrusion or by helical winding or both. It will be understood that the expression "vulcanizing" means subjecting the recited material to an elevated temperature for a long enough period for the development of a cross-linked structure whether through the incorporation of vulcanizing agents or otherwise. It will also be understood that reference to "elastomeric" or "plastomeric" material includes for convenience reference to such material in which the recited properties are only potentially present and are developed as a result of the vulcanizing process. For example, the hose may originally comprise an unvulcanized rubber composition including a vulcanizing agent; the elastomeric properties of the rubber are only developed effectively by the vulcanization process.

It has been the practice to use the so-called catenary method for the vulcanization (curing) of continuous lengths of rubber hose. However, this technique yields only a relatively low output from a given size of equipment. It is an object of the present invention to provide a continuous vulcanization process and apparatus affording a higher output than the catenary method.

The invention consists in a method of vulcanizing continuous lengths of elastomeric or plastomeric material, hereinafter for convenience referred to as flexible material, which comprises driving the material through an enclosure within which it is subjected to vulcanization conditions, in the form of a helix the helix convolutions in part contacting a drive mechanism and in part being freely suspended.

By feeding the continuous length of flexible vulcanizable material through an enclosure such as a steam vulcanization chest, as a helix partly in the form of festoons so that the material is exposed to the vulcanizing conditions obtaining within the enclosure, a higher production speed is made possible as a result of the greatly increased footage provided within the heater. At the same time, because the material is uniformly exposed to the atmosphere within the enclosure in the festoon portions, the vulcanization proceeds evenly.

To drive the helix within the vulcanization enclosure, each convolution will generally be supported at spaced positions and may be driven from one such position, the material between adjacent positions being self-supporting i.e., festooned. Two such positions for each convolution will generally be sufficient, and may for example by provided by a coaxial assembly of pulleys or by a correspondingly channeled drum or roller to locate as well as support the length of vulcanizing material passing over it.

In the case of a vulcanization chest operating with saturated or superheated steam under pressure, sufficiently steam-tight inlet and outlet ports for the continuous length of material will be provided. The inlet may be for material fed from a previously assembled store thereof, for example from a supply drum, or it may admit the continuous length of material directly from apparatus for the manufacture thereof, for example from the head of a machine for applying the cover to a hose in the final stage of assembly thereof. Generally the cover will be applied to the hose which includes a flexible mandrel on the interior but in some instances, no internal support such as a flexible or rigid mandrel is present. In any event, the hose never includes an external sheath of any kind over the external surface of the hose such as a lead jacket or fabric wrap to provide a surface configuration or internal pressure resisting means.

In a preferred arrangement two spaced supports are provided for the inner faces of the helix convolutions, one a rotary driving member and the other a rotary idler of smaller diameter. Each may be in the form of a coaxial set of pulleys or a circularly channelled drum or roller, or one may be uncontoured or carry a surface layer of compressible material such as e.g. a rubber or plastics foam material so that the contacting portion of the vulcanizing material is resiliently supported.

The invention also consists in apparatus for vulcanizing continuous lengths of flexible material, comprising an enclosure, means for providing therein an atmosphere at an elevated temperature and pressure, spaced pressure-retaining inlet and outlet means for the continuous flexible material, and drive and support means for feeding the material through the enclosure in the form of a helix comprising partially unsupported convolutions. The inlet to the enclosure may be the outlet from apparatus for manufacturing the continuous lengths; the drive and support means may be as already described. As the hose is fed through the enclosure, the hose is not subjected to any significant tension so as to eliminate any flat spotting or other distortions which would occur if the hose was under tension prior to vulcanization of the elastomeric material of the hose.

The invention will be described further with reference to the accompanying drawing, which is a perspective view of a steam vulcanization chest adapted for use in accordance with the method of the invention.

The chest comprises a cylinder 1 with end walls (not shown) and a steam inlet 2 leading to a steam distribution pipe 3 within the cylinder 1 (which is shown partly cut away). Journalled within an upper part of the cylinder is a roller 4 carried on bearings 5 (of which only one is seen) and driven by a suitable motor 6 through a suitable coupling 7. Journalled at 8 below the roller 4 is a second roller 9 of smaller diameter the surface of which is contoured as at 10 to provide a succession of semi-circular section circular channels. Unvulcanized hose 11 from a supply drum 12 is fed over a guide roller 13 through a pressure-retaining inlet port 14 into the interior of the chest 1. The hose is then led around the roller 4 and then wound in the form of a helix around the rollers 4 and 9 occupying successive channels 10 in the roller 9 whereby the convolutions of the resulting helix are maintained at a given spacing. From the end of the resulting helix 15 the hose is led out through a pressure retaining port 16 through a hauling device 17 past a guide roller 18 on to a wind-up drum 19 on which the now vulcanized hose is eventually stored.

The surface of the roller is left smooth, or it may be lined with a resiliently compressible material such as a heat-resistant plastics sponge for the purpose already indicated. Alternatively, the drive roller 4 may be channelled as already described for the roller 9, then the latter may be left smooth or lined with a resiliently compressible rubber sponge. It is however desirable that one of the rollers 4 and 9 should be contoured to locate the convolutions, and it will be understood that more than one idler roller 9 may be provided. Between the idler roller and the drive roller 4, the convolutions of the helix appear as festoons, that is to say they are unsupported and uniformly subjected to vulcanizing conditions within the steam chest 1.

Where the drums are grooved, it is preferred that the radius of the semi-circular grooves should be slightly larger than the external diameter of the hose.

It will be understood that the flexible vulcanizable material fed through the vulcanizing apparatus in accordance with the invention will in general be accompanied by other material, such as fibrous reinforcement and filler material. Thus for example, the hose to be vulcanized in the example just given may comprise an inner extruded tubular portion, balanced windings of fibre-reinforced rubber stock and an outer sleeve or cover.

What we claim is:

1. A method of vulcanizing continuous lengths of unsheathed and unvulcanized elastomeric or plastomeric hose comprising feeding in the absence of significant tension a continuous length of such hose without internal support in a helical path around a pair of rolls mounted on horizontal axis in a vulcanizing chamber, the surface of at least one of said rolls being contoured to position the convolutions of hose thereon and one of said rolls being of a substantially larger diameter than and mounted above and spaced from the other roll so that a substantial portion of the length of the hose is free of any contact with the roll surfaces and also self-supporting, providing sufficient pressure and temperature within said chamber to cause vulcanization of the elastomeric or plastomeric material and driving one of said rolls to continuously feed the hose through said vulcanizing chamber in said helical path from one end of the chamber to the other whereby the length of hose is vulcanized as it passes through said chamber.

2. A method as claimed in claim 1 in which the surface of each of said rolls is contoured to position the convolutions of the hose thereon.

3. A method as claimed in claim 1 in which the large roll has a resilient cylindrical surface and the smaller roll has a contoured channel to support the convolutions of the hose as it passes thereover.

* * * * *